US006939497B2

(12) United States Patent
Scolamiero

(10) Patent No.: US 6,939,497 B2
(45) Date of Patent: Sep. 6, 2005

(54) METHOD FOR FORMING GOLF BALL CORES

(75) Inventor: Stephen K. Scolamiero, Bristol, RI (US)

(73) Assignee: Acushnet Company, Fairhaven, CT (US)

(*) Notice: Subject to any disclaimer, the term of this patent is extended or adjusted under 35 U.S.C. 154(b) by 405 days.

(21) Appl. No.: 09/924,348

(22) Filed: Aug. 8, 2001

(65) Prior Publication Data

US 2003/0038399 A1 Feb. 27, 2003

(51) Int. Cl.[7] .............................................. B29C 43/02
(52) U.S. Cl. ....................... 264/236; 264/325; 264/347; 264/DIG. 59
(58) Field of Search ................................. 264/236, 347, 264/325, DIG. 59

(56) References Cited

U.S. PATENT DOCUMENTS

| | | | | |
|---|---|---|---|---|
| 3,072,968 A | * | 1/1963 | Watson et al. | 264/211.2 |
| 3,965,055 A | * | 6/1976 | Shichman et al. | 260/3 |
| 4,692,497 A | * | 9/1987 | Gendreau et al. | 525/263 |
| 5,051,226 A | * | 9/1991 | Brustad et al. | 264/511 |
| 6,093,357 A | * | 7/2000 | Bissonette et al. | 264/248 |
| 6,180,040 B1 | * | 1/2001 | Ladd et al. | 264/248 |
| 6,200,512 B1 | | 3/2001 | Dewanjee et al. | 264/250 |

* cited by examiner

*Primary Examiner*—Edmund H. Lee
(74) *Attorney, Agent, or Firm*—William B. Lacy

(57) ABSTRACT

A method of forming a golf ball core includes compression molding a core material in a mold cavity to form a partially-cured core, then the partially-cured core is removed from the mold cavity and placed in a medium to continue curing until it is substantially-cured. The method can also be used to form a golf ball by adding the step of forming a cover layer over the substantially-cured core.

12 Claims, 7 Drawing Sheets

METHOD FOR FORMING GOLF BALL CORES

FIELD OF THE INVENTION

The present invention relates to a method for forming golf ball cores and balls and, in particular, a method for optimizing a cure state of golf ball cores while reducing a required molding time. In addition, the present invention relates to a system for using such a method.

BACKGROUND OF THE INVENTION

Balls having a two-piece construction are generally most popular with the average recreational golfer because they provide a very durable ball while also providing maximum distance. Two-piece balls are made with a single-solid core, usually comprised of a crosslinked rubber, which is encased by a cover material. Typically the solid core is made of a polybutadiene blend which is chemically crosslinked through the use of a combination of initiators and crosslinking agents dispersed throughout the rubber stock. Common additives to the rubber stock are zinc diacrylate (ZDA) to affect the optimal cross linking level as well as various peroxide initiators that will affect the time rate of crosslinking. The core material is typically compression molded and the cover is applied in a separate operation, either compression molded or injection molded around the core. The cover material is often a tough, cut-resistant elastomer.

Regardless of the form of the ball, players generally seek a golf ball construction that has particular play characteristics of velocity and spin, which match their swing style and club preference. It is well know in the golf ball industry that both initial ball velocity and spin have both been determined to be substantially dependent on the compression of the core. Typically the optimal level of crosslinking of the core material is predetermined and adjusted by the level of crosslinking agent to arrive at the desired core compression. Once players select a ball construction, they want consistent play characteristics between individual balls. Thus, to maintain consistent play performance between individual balls of a particular construction, manufacturers must produce golf balls with very consistent level of crosslinking of the core material.

The golf ball core is formed within a compression type mold, which is heated to accelerate the core stock crosslinking reaction. The magnitude of temperature of the mold will affect the time rate of crosslinking of the core stock and therefore will affect the length of time the stock must reside in the mold (or cure time) to achieve complete or optimal level of crosslinking. The mold is typically comprised of multiple cavities to facilitate high volume manufacturing. In different locations within the core mold, cavity temperature will vary, for example cavity locations along the outside perimeter will be cooler than the cavity locations in the inner regions of the mold. Therefore, in order to achieve complete crosslinking for all cores in all cavity locations, the cure time must be adjusted for the coolest regions that will have the lowest rate of reaction of the core stock.

When compression molding cores, the molding cycle times are generally a compromise between productivity levels and the consistency of golf ball core compressions. Shorter cure cycles increase the productivity levels of golf ball core molding equipment by facilitating production of more golf ball cores per molding machine. With shorter cure cycles, however, the golf ball cores in cooler regions of the mold are typically only cured to between 85% and 95% of optimal cure. This less than 100% cure state of the golf ball core makes it difficult to maintain a tight range of core compressions or consistent compressions. Also, because of the shorter cure cycle, the amount of crosslinking agent is often increased to reach the desired golf ball compression. Standard compression molding occurs at a cavity pressure of 4000 p.s.i., at a temperature of 335° F. for a time of 11 minutes.

As the cure state of the core production population reaches 100%, the crosslinking agent can be maintained at a comparatively lower level, saving substantial amounts of the chemical. In turn, making the cores less expensive. Also, a core population with cure state near 100% negates the inconsistencies in core compressions caused by variations in the molding temperature.

One method of forming a golf ball core is disclosed in U.S. patent application Ser. No. 09/145,882, filed Sep. 2, 1998 by D. Ladd et al. This is a method for forming a golf ball core with at least one mantle layer formed around a center. First, a solid spherical center is prepared by one of the conventional compression, injection molding, or winding techniques. Then, a mixture is formed into a plurality of shells having the desired shape of the mantle layer, and the shells are heat cured until they are sufficiently rigid to maintain their desired shape. Finally, the shells are assembled around the golf ball center to form the core, and the core is subjected to a second curing cycle, such as compression molding, to further crosslink the mixture and form a cured golf ball core.

Thus, golf ball manufacturers are continually searching for new ways in which to make golf balls that perform well, that maintain the productivity of golf ball core molding equipment, and at the same time that provide a cure state of the core near 100%. The present invention provides such a method.

SUMMARY OF THE INVENTION

The present invention is directed to a method of forming a core of a golf ball. The method comprises the steps of providing a core material, compression molding the core material in a mold cavity at a first predetermined temperature for a first predetermined time such that the core material becomes a partially-cured core, and placing the partially-cured core in a medium at a second predetermined temperature for a second predetermined time to form a substantially-cured core. The step of compression molding may occur at a cavity pressure from about 1,800 psi to about 10,000 psi.

According to one embodiment, the first predetermined temperature is between about 250° F. and about 500° F. and the first predetermined time is between about 3 minutes and about 30 minutes. Preferably, the predetermined temperature is between about 300° F. and about 400° F. and the first predetermined time is between about 6 minutes and about 20 minutes. Most preferably, the first predetermined temperature is between about 325° F. and about 375° F. and the first predetermined time is between about 7 minutes and about 12 minutes.

According to another embodiment, the second predetermined temperature is substantially greater than the first predetermined temperature. The difference between the first predetermined temperature and the second predetermined temperature is at least about 100° F. The second predetermined time is between about 2 minutes and about 20 minutes. Preferably, the second predetermined temperature is between about 350° F. and about 500° F.

The step of placing the partially-cured core in a medium may further include placing the partially-cured core in a convection oven, whereby the medium is the heated circulating air. In another embodiment, the step of placing the partially-cured core in a medium further includes placing a plurality of partially-cured cores in an insulated chamber, whereby the hot cores themselves act as the medium to cure the cores.

According to another embodiment of the present invention, the method of forming the core of a golf ball includes the steps of providing a core material, compression molding the core material in a mold cavity at a first predetermined temperature for a first predetermined time such that the core material cures sufficiently to retain the geometry of the mold cavity and not sufficiently to form a substantially-cured core so that the core material forms a partially-cured core, and placing the partially-cured core in a medium at a second predetermined temperature for a second predetermined time to form the substantially-cured core.

The present invention is also directed to a method of forming a golf ball. The method comprises the steps of providing a core material, compression molding the core material in a mold cavity such that the core material forms a partially-cured core, placing the partially-cured core in a medium to form a substantially-cured core, and forming a cover layer over the substantially-cured core. In one embodiment, the method further includes a step of grinding the substantially-cured core prior to forming the cover layer over the substantially-cured core.

In addition, the present invention is directed to a system for forming a golf ball core. The system comprises an apparatus for making a core material, a compression mold for partially curing the core material, and a medium for substantially curing the core material.

In one embodiment, the medium is within a chamber that is separate from the compression mold and contains the medium at a predetermined temperature. According to one embodiment, it the predetermined temperature of the chamber is greater than a cavity temperature in the compression mold.

Preferably, the medium is a plurality of particles or fluid. In this embodiment, the medium is selected from the group comprising solid particles, ceramic pellets, glass pellets, metal, sand, air, and fluids such as non-penetrating liquids. Preferably, the solid particles are between 40 microns and 0.1 inch According to one embodiment of the invention, the medium is contained in a convection oven. According to embodiment, the medium is air and other cores contained in an insulated chamber.

DESCRIPTION OF THE PREFERRED EMBODIMENTS

Figure 1:
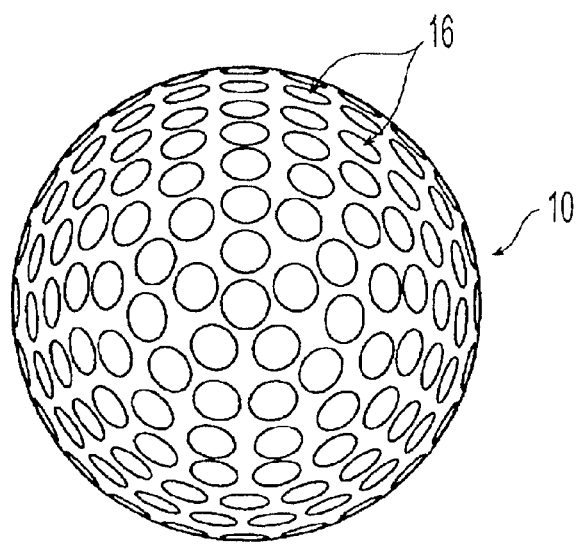
FIG. 1 is a perspective view of a golf ball formed according to a method of the present invention.
Figure 2:
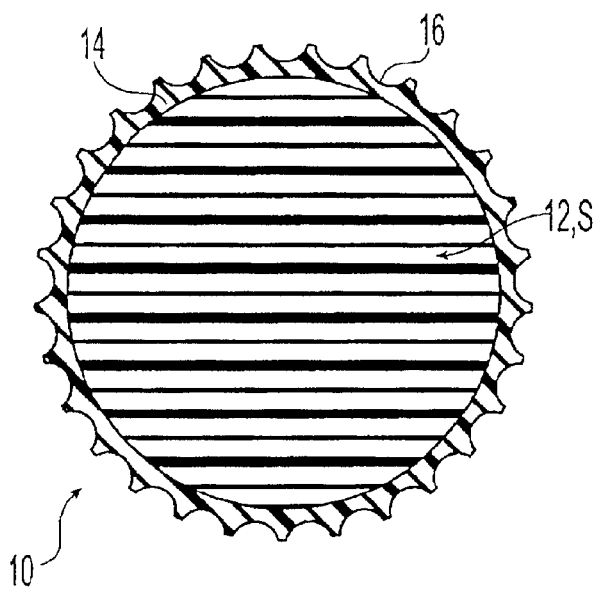
FIG. 2 is a cross-sectional view of the golf ball of FIG. 1.

Referring to FIGS. 1 and 2, a method of the present invention can be used to make a golf ball 10 which comprises a core 12 surrounded by at least one cover layer 14. The cover layer 14 forms the outer surface of the ball 10 and defines dimples 16 therein. In the golf ball 10, the core 12 is the golf ball subassembly S and is of a molded, solid construction.

Figure 3:
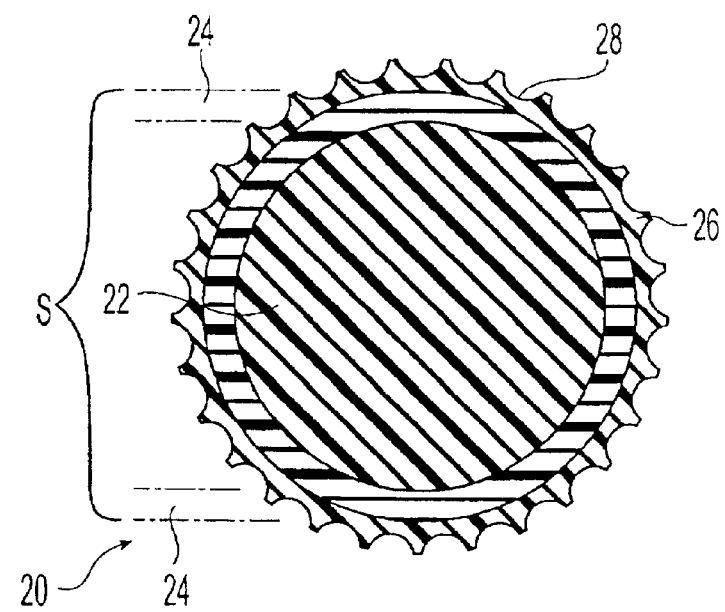
FIG. 3 is a cross-sectional view of another embodiment of a golf ball formed using the method of the present invention.

Referring to FIG. 3, the method of the present invention can be used to make a golf ball 20 that includes a core 22 surrounded by at least one intermediate layer 24, which is surrounded by a cover 26. The core 22 and the intermediate layer 24 form the golf ball subassembly S. The cover 26 defines dimples 28.

Although the golf balls 10 and 20 are shown with solid cores 12 and 22, respectively, the present invention can also be used with cores that have fluid-filled centers. The fluid within the core center can be a wide variety of materials including air, water solutions, liquids, gels, foams, hot-melts, other fluid materials and combinations thereof, as known by those of ordinary skill in the art.

Figure 4:
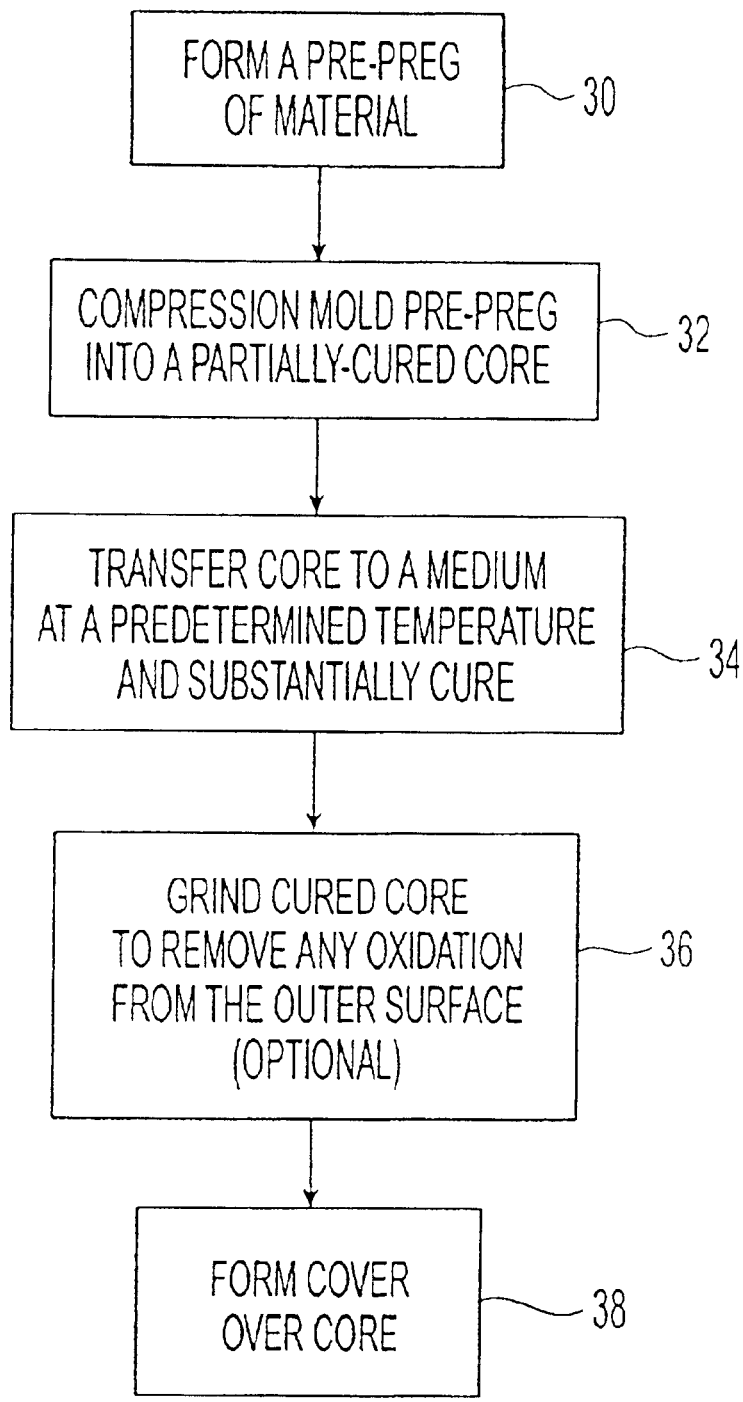
FIG. 4 is a flow chart showing the method of making a golf ball according to the present invention.

Referring to FIG. 4, the method of making golf balls 10 and 20 (as shown in FIGS. 2 and 3) according to the present invention generally includes steps 30–38 and will now be discussed. Step 30 includes forming a preform of material to be made into the golf ball core 12 (as shown in FIG. 2) or core 22 (as shown in FIG. 3) depending on the construction of the golf ball subassembly.

The preform is formed of compositions having a base rubber, an initiator, crosslinking agents, a filler and a co-crosslinking agent. The base rubber is typically a synthetic rubber like 1,4-polybutadiene having a cis-structure of at least 40%. Natural rubber, polyisoprene rubber and/or styrene-butadiene rubber may optionally be added to the 1,4-polybutadiene. The initiator included in the core composition can be any polymerization initiator, which decomposes during the cure cycle. Alternatively, the initiator can be a system that includes at least one low temperature initiator and at least one high temperature initiator, wherein the low temperature initiator begins reacting at a lower temperature than the high temperature initiator does. The details of this initiator system are disclosed in U.S. patent application Ser. No. 09/145,882, filed Sep. 2, 1998 by D. Ladd et al., which is hereby incorporated by reference in its entirety.

The crosslinking and co-crosslinking agents include a metal salt of an unsaturated fatty acid such as sodium, zinc, lithium or magnesium salt or an unsaturated fatty acid having 3 to 8 carbon atoms such as acrylic or methacrylic acid. Preferably, zinc diacrylate and peroxide are used in these cores. The filler typically includes materials such as zinc oxide, barium sulfate, silica, calcium carbonate, zinc carbonate, regrind and the like.

Other ingredients such as accelerators, e.g. tetra methylthiuram, processing aids, processing oils, plasticizers, dyes and pigments, as well as other additives well known to one of ordinary skill in the art may also be used in the present invention in amounts sufficient to achieve the purpose for which they are typically used.

Other suitable materials for the cores include thermosets, such as rubber, polyisoprene; thermoplastics such as ionomer resins, polyamides or polyesters; or a thermoplastic elastomer. Suitable thermoplastic elastomers include but are not limited to Pebax®, Hytrel®, thermoplastic urethane, and Kraton®, which are commercially available from Elf-Atochem, DuPont, various manufacturers, and Shell, respectively. The core material can also be formed from a castable material. Suitable castable materials include, but are not limited to urethane, polyurea, epoxy, and silicone.

Figure 5:
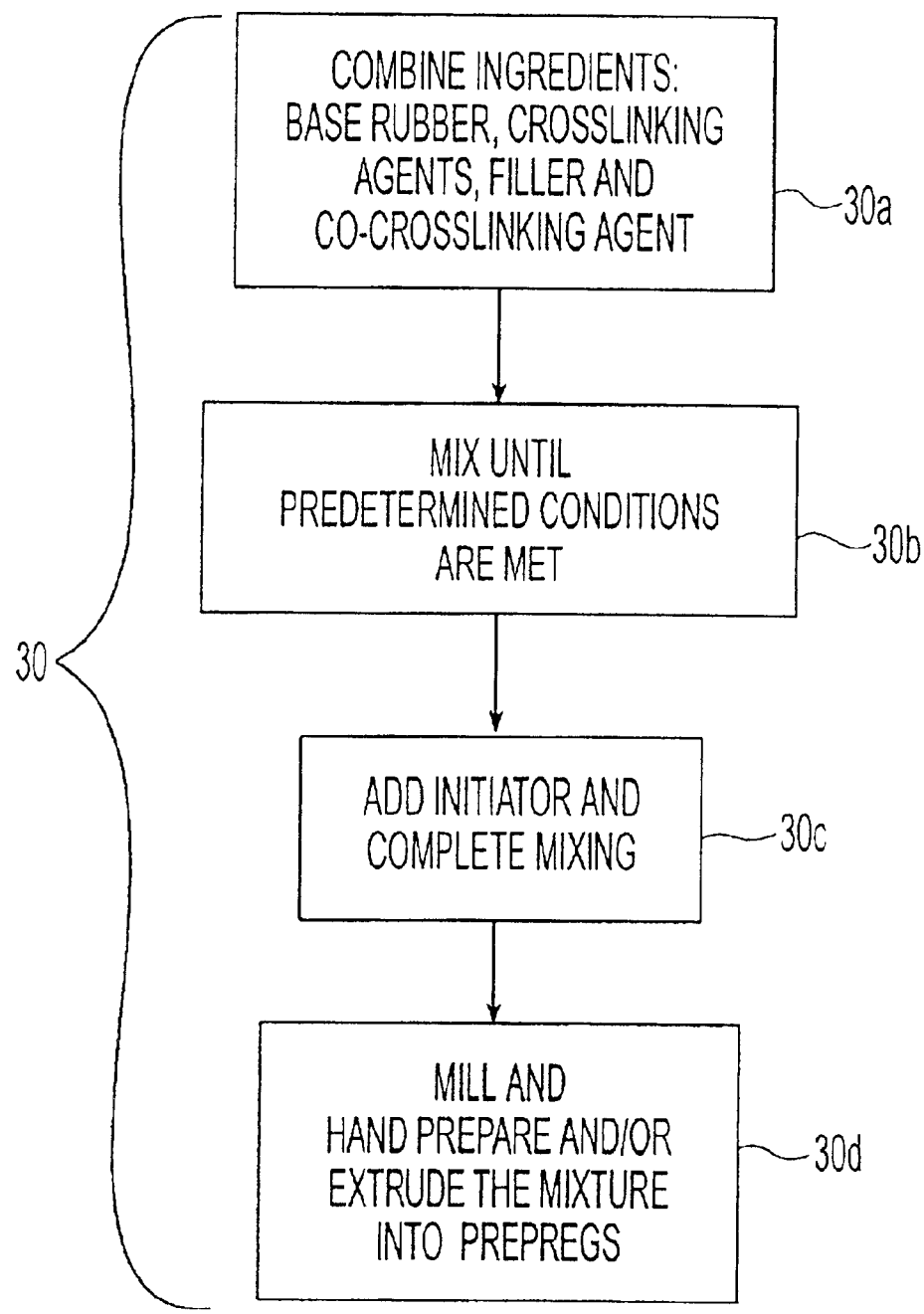
FIG. 5 is a flow chart showing the details for a step of forming a prepreg of material in the method shown in FIG. 4.

Referring to FIG. 5, making a preform step 30 is shown in more detail as steps 30a–30d. In the combining step 30a, all of the ingredients except the initiator are combined. In the mixing step 30b, the ingredients are mixed until a set of predetermined conditions is met, i.e., time and temperature of mixing. In particular, as the components are mixed, the resultant shear causes the temperature of the mixture to rise. Then, in step 30c, the initiator is added to the other ingredients in an amount dependent upon the amounts and relative ratios of the starting components, as would be well understood by one of ordinary skill in the art, and the mixing is completed. Although the initiator is shown as being added in a separate step 30c, the initiator could alternatively be added in step 30a and the mixture mixed then milled and prepared into pieces ("prepregs") suitable for molding.

After completion of the mixing in step 30c, the golf ball core composition is milled and hand-prepped and/or extruded into prepregs as represented in step 30d. Prepregs are pieces of core material of a size and shape suitable for molding. The apparatus for making core material is any apparatus used in preparing prepregs. In this embodiment, this application includes a mixer, a mill and an extruder, however the present invention is not limited to these apparatuses. Other devices can make up such apparatuses as known by those of ordinary skill in the art.

Referring again to FIG. 4, after making the prepregs in step 30, step 32 includes compression molding the prepreg into a partially-cured core. Compression molding step 32 can be performed with a core molding press or other compression molding equipment well known to one of ordinary skill in the art.

As used herein, the terms "partially" cured and "substantially" cured refer to relative amounts of reacted crosslinking agent that has been added to the preform material at a predetermined level to achieve the required crosslink density. Crosslink density ultimately determines the hardness of the cured material as measured in golf balls as compression. A "substantially" cured core has as much of the crosslinking agent reacted as possible within the limits of the ability to mix the core material and obtain even distribution of crosslinking agent throughout the mixture. A "partially" cured core is anything less than "substantially" cured. The amount of crosslinking can be determined empirically or the amount of curing can be determined using the performance characteristics of the core, such as core compression. Using core compression, a "substantially" cured core may have a core compression within a predetermined range of a target core compression. "Partially" cured also means that the core material crosslinks sufficiently so that the core material retains the geometry of a cavity in the mold, but is not crosslinked to a completely cured state. Before the core material is "partially" cured, it is too soft or fluid-like and cannot retain the cavity geometry.

Compression molding step 32 should be performed at a cavity pressure, a first predetermined temperature or cavity temperature, and for a first predetermined time or molding time sufficient for the preform to achieve a partial cure state substantially below 100%. The cavity pressure should range from about 1,800 p.s.i. to about 10,000 p.s.i., and it is preferred that the cavity pressure range from about 3,000 p.s.i. to about 4,000 p.s.i. It is recommended that the cavity temperature is between about 250° F. and about 500° F. for a recommended molding time of between about 3 minutes and about 30 minutes. Preferably, the cavity temperature is between about 300° F. and about 400° F. for the preferred molding time of between about 6 minutes and about 20 minutes. Most preferably, the cavity temperature is between about 325° F. and 375° F. for the molding time of between about 7 minutes and about 12 minutes.

After compression molding step 32 is completed, the partially-cured core is removed from the mold cavity and placed in a medium at a second predetermined temperature or "medium temperature" for a second predetermined time or post-molding time to form a substantially-cured core. The medium of post-molding step 34 can be solid particles such as ceramic pellets, metals, glass particles, or sand. Preferably the particles are between 40 microns and 0.1 inch. The medium can also be a fluid such as air or a non-penetrating liquid. Alternatively, the medium can be a combination of solids and fluids such as sand in water. Additionally, the medium can be any material suitable for transferring heat to the partially-cured core.

The medium can be contained in a sealed or insulated chamber. In one embodiment, the chamber is heated, such as a convection oven such that forced hot air cures the cores. In another preferred embodiment, the cores are sealed inside a chamber that is enclosed with an insulating material. In this embodiment, the sealed container will retain a majority of the heat within the core that was transferred into the core from the heated mold and will retain the heat from the exothermic reaction of the core crosslinking. Thus, the insulated chamber can be maintained a temperature substantially equal to or greater than the compression molding temperature. Preferably, the temperature in the insulated chamber is maintained above 300° F. such that the retained heat will perform the post-mold curing.

In an alternate embodiment, the medium temperature of post-molding step 34 is heated to a temperature greater than the cavity temperature from molding step 32. It is also recommended that the post-molding time is between about 5 minutes and about 20 minutes. Preferably, the medium temperature is between about 300° F. and about 500° F. Most preferably, the medium temperature is between about 350° F. and about 500° F.

Upon completion of step 32, the core is substantially-cured and forms the golf ball subassembly S of FIG. 2.

In an alternate embodiment, with reference to FIG. 3 an intermediate layer 24 can be formed on the partially-cured core after compression molding step 32 and post-mold curing step 34. The intermediate layer 24 can be formed by molding conventional core or cover materials on the substantially-cured core or the intermediate layer can be formed by winding elongated thread on the substantially-cured core. The molding techniques used to form the intermediate layer can be those such as injection molding or compression molding. In an alternative embodiment, the ball 20 can be formed with any number of intermediate layers formed in any manner. These layers can be solid or wound. The completed assembly is the golf ball subassembly S of FIG. 3.

Referring again to FIG. 4, after completion of post-mold curing step 34, optional grinding step 36 includes any method to remove the outer surface to a predetermined depth, such as centerless grinding the golf ball subassembly S to remove any residual mold release or flaws that may have developed on the surface of subassembly S during the compression molding step 32.

After completion of optional grinding step 36, cover step 38 includes forming a cover layer over the golf ball subassembly S. Any conventional material or method may be used in forming the golf ball cover over the subassembly S. Referring again to FIGS. 2 and 3, the covers 14 and 26 should be tough, cut-resistant, and selected from conventional materials used as golf ball covers based on the desired performance characteristics. The cover may include one or more layers. Cover materials can be injection moldable, such as ionomer resins, blends of ionomer resins, thermoplastic urethane, polyisoprene blends thereof, and a thermoset polyurethane, such as a castable polyurethane as known in the art.

Figure 6:
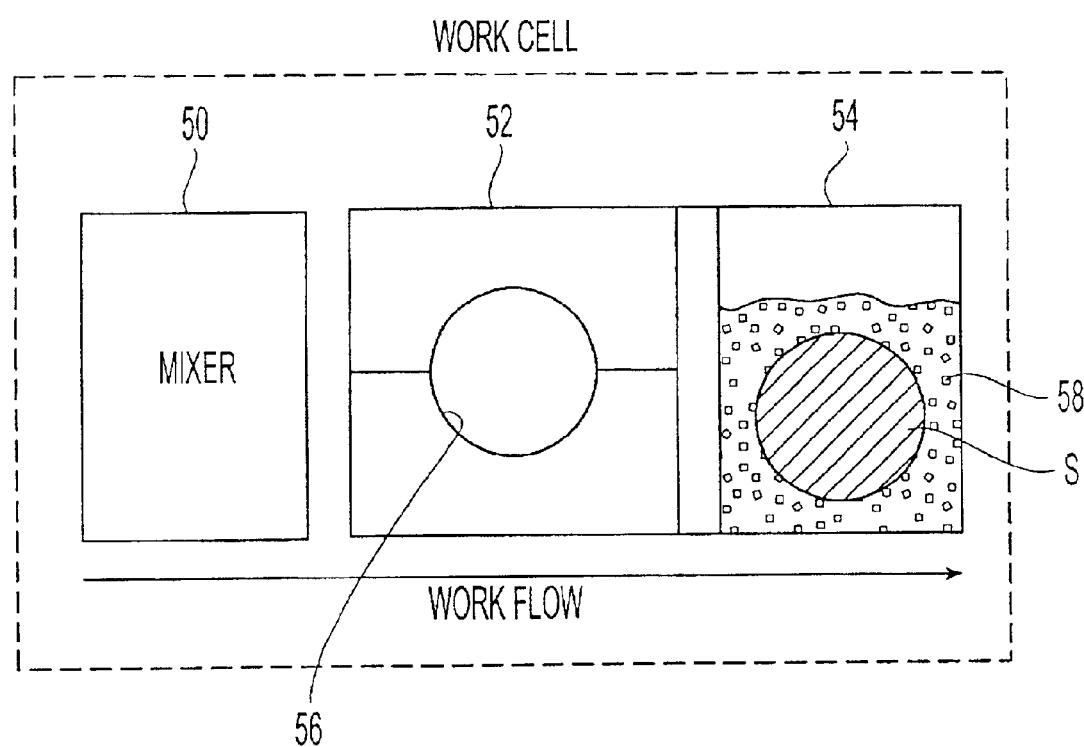
FIG. 6 is a schematic representation of a system for forming a golf ball core according to the present invention.

Referring now to FIG. 6, a schematic representation of a system 40 for forming a golf ball core using the inventive method is shown. The system 40 includes a mixer 50 and a compression mold 52. The mold 52 is integrated with a post-mold curing chamber 54. In one embodiment, the compression mold 52 and the post-mold curing chamber 54 are located beside each other in a flow-through centralized system within the same work cell to expedite movement of the cores from one station to the next in between each step of forming the golf balls. Preferably, multiple cores are stored in a single container and transported from station to station together. In the most preferred embodiment, the mixer 50, compression mold 52 and post-mold curing chamber 54 are connected by an automated conveyer system. In this embodiment, the conveyer transports the cores from one station to the next in an automated process. For example, a conveyer can transport a preform from the mixer 50 to the compression mold 52, and then through the post-mold curing chamber 54 to produce a substantially-cured core.

The mixer 50 is an apparatus for blending core material and is used for mixing the preform of core material, as discussed above. Mixer 50 can be any apparatus or mixing device known by one skilled in the art suitable for mixing golf ball core compositions. The compression mold 52 is preferably a core molding press with a cavity 56. The cavity has a predetermined geometry or shape. In this embodiment, that geometry is spherical, however the present invention is not limited to this geometry. The compression mold 52 is used to partially-cure the core preform material. Most preferably, the compression mold 52 is a multi-cavity mold hinged along one side so that the mold can be opened and closed. When closed, the mold is placed into a hydraulic press.

The chamber 54 is separate from the mold cavity 56 of the compression mold 52 and preferably contains a medium 58 of solid particles at a predetermined temperature suitable for substantially-curing the core material. Preferably, the chamber 54 is heated to a temperature greater than the molding temperature and insulated to increase the temperature of the partially-cured core after it is removed from the compression mold 52. The medium 58 can be either a solid or a fluid as discussed above.

When golf balls are prepared according to the invention, they typically will have dimple coverage greater than about 60 percent, preferably greater than about 65 percent, and more preferably greater than about 70 percent. The flexural modulus of the cover on the golf balls, as measured by ASTM method D-790, is typically greater than about 500 psi, and is preferably from about 500 psi to 150,000 psi. The hardness of the cover is typically from about 35 to 80 Shore D, preferably from about 40 to 78 Shore D, and more preferably from about 45 to 75 Shore D.

EXAMPLES

These and other aspects of the present invention may be more fully understood with reference to the following non-limiting examples, which are merely illustrative of the embodiments of the present inventive method, and are not to be construed as limiting the invention, the scope of which is defined by the appended claims. In these examples, compression is based on the compression scale, or the scale based on the ATTI Engineering Compression Tester. This scale, which is well known to those working in this field, is used in determining the relative compression of a core or ball. Some artisans use the Reihle compression scale instead of the standard compression scale. Based on disclosure in U.S. Pat. No. 5,368,304, column 20, lines 55–53 it appears that Reihle compression values can be converted to compression values through the use of the following equation:

compression value=160–Reihle compression value.

|  | COMPARATIVE | | | | | | INVENTIVE | | |
| --- | --- | --- | --- | --- | --- | --- | --- | --- | --- |
| Mold Cavity No. | 1 | 2 | 3 | 4 | 5 | 6 | 7 | 8 | 9 |
| EXAMPLE 1 Medium: Sand Avg. Cavity Temp.: 310° F./Avg. Medium Temp.: 406° F. | | | | | | | | | |
| Molding time (Min.) | 5 | 5 | 5 | 5 | 5 | 5 | 5 | 5 | 5 |
| Post-Mold Cure Time (Min.) | 0 | 0 | 0 | 0 | 0 | 0 | 10 | 10 | 10 |
| Core Compression (Atti) | 64.2 | 65.1 | 65.3 | 65.1 | 64.3 | 65.5 | 72.7 | 72.0 | 73.1 |
| Avg. Core Compression (Atti) | COMPARATIVE: 64.9 | | | | | | INVENTIVE: 72.6 | | |
| EXAMPLE 2 Medium: Sand Avg. Cavity Temp.: 319° F./ Avg. Medium Temp.: 420° F. | | | | | | | | | |
| Molding time (Min.) | 7 | 7 | 7 | 7 | 7 | 7 | 7 | 7 | 7 |
| Post-Mold Cure Time (Min.) | 0 | 0 | 0 | 0 | 0 | 0 | 10 | 10 | 10 |

-continued

| | COMPARATIVE | | | | | | INVENTIVE | | |
|---|---|---|---|---|---|---|---|---|---|
| Mold Cavity No. | 1 | 2 | 3 | 4 | 5 | 6 | 7 | 8 | 9 |
| Core Compression (Atti) | 71.8 | 71.2 | 72.0 | 71.8 | 71.8 | 72.7 | 75.0 | 75.4 | 75.6 |
| Avg. Core Compression (Atti) | COMPARATIVE: 71.9 | | | | | | INVENTIVE: 75.3 | | |

EXAMPLE 3
Medium: Sand
Avg. Cavity Temp.: 308° F./Avg. Medium Temp.: 467° F.

| | | | | | | | | | |
|---|---|---|---|---|---|---|---|---|---|
| Molding time (Min.) | 9 | 9 | 9 | 9 | 9 | 9 | 9 | 9 | 9 |
| Post-Mold Cure Time (Min.) | 0 | 0 | 0 | 0 | 0 | 0 | 10 | 10 | 10 |
| Core Compression (Atti) | 71.8 | 71.2 | 71.4 | 70.8 | 70.7 | 70.2 | 74.4 | 75.2 | 74.8 |
| Avg. Core Compression (Atti) | COMPARATIVE: 71.0 | | | | | | INVENTIVE: 74.8 | | |

EXAMPLE 4
Medium: Sand
Avg. Cavity Temp.: 291° F./ Avg. Medium Temp.: 455° F.

| | | | | | | | | | |
|---|---|---|---|---|---|---|---|---|---|
| Molding time (Min.) | 11 | 11 | 11 | 11 | 11 | 11 | 11 | 11 | 11 |
| Post-Mold Cure Time (Min.) | 0 | 0 | 0 | 0 | 0 | 0 | 10 | 10 | 10 |
| Core Compression (Atti) | 71.0 | 70.6 | 69.7 | 70.2 | 69.5 | 69.9 | 76.7 | 77.8 | 77.7 |
| Avg. Core Compression (Atti) | COMPARATIVE: 70.2 | | | | | | INVENTIVE: 77.4 | | |

Examples 1–4 show the results of conventional compression molding, with no post-mold curing (COMPARATIVE), along with the results of molding according to the present invention (INVENTIVE). The molding time, post-mold cure time and cavity temperature were varied in the different examples. Referring to each of the Examples 1–4, the average core compression of the cores subjected to post-mold curing was from 3.4 to 7.7 compression points higher than the average core compression of the cores subjected to mold curing alone. Thus, the inventive method results in cores having a higher average compression than cores made according to conventional compression molding techniques alone.

Figure 7:
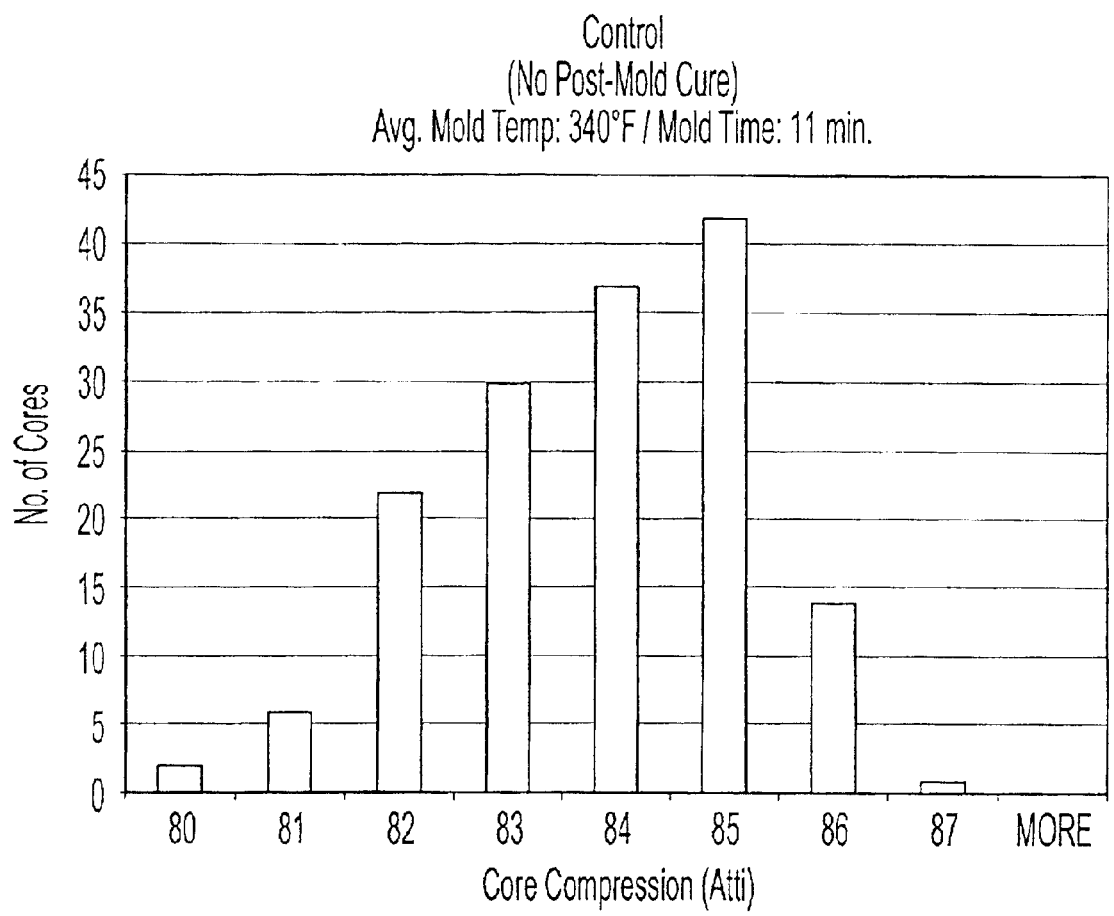
FIG. 7 is a histogram showing a range of core compressions achieved by a core-molding trial using a conventional, prior art molding method.
Figure 8:
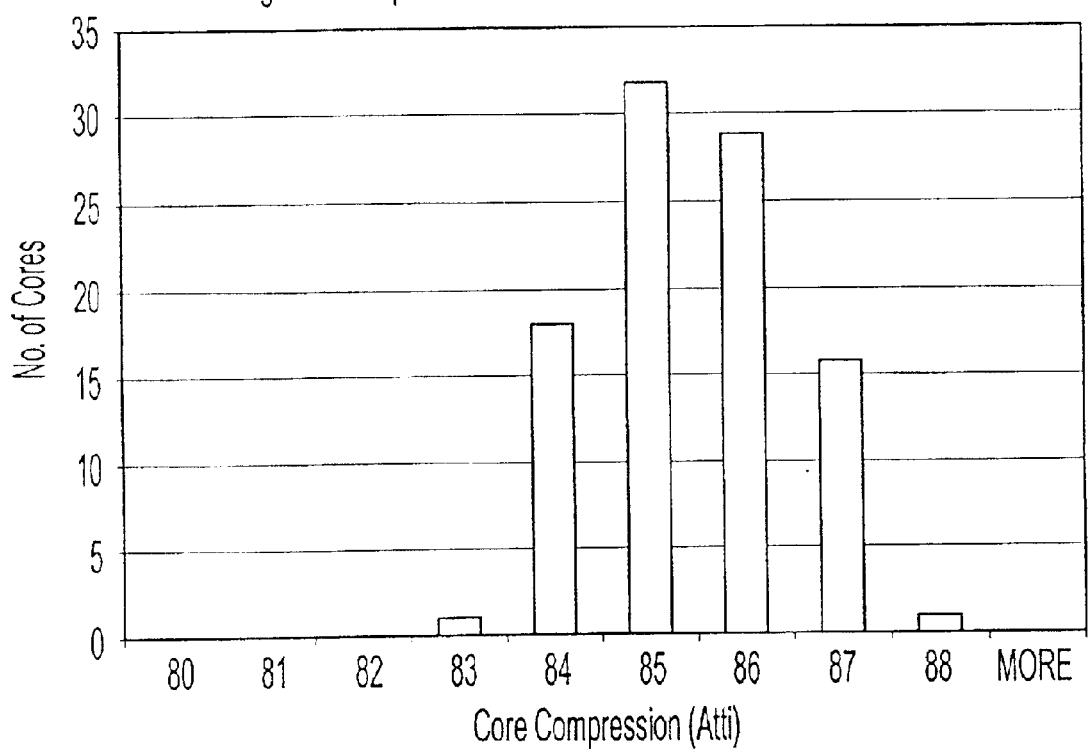
FIG. 8 is a histogram showing a range of core compressions achieved by a core-molding trial using a molding process according to the present invention.
Figure 9:
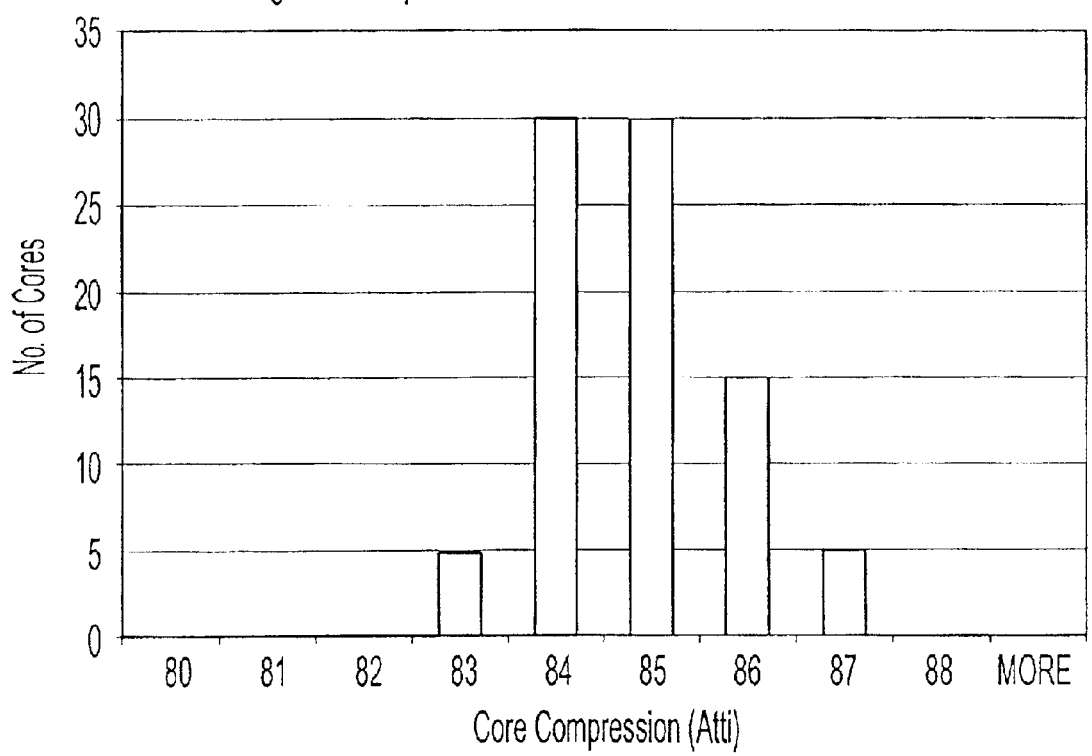
FIG. 9 is a histogram showing a range of core compressions achieved by a core-molding trial using a different molding process according to the present invention.

Referring to FIGS. 7–9, which are histograms showing the results for three core molding trials, the graphs show the range of core compressions achieved, and the number of cores having each compression. FIG. 7 shows the results of a control trial, using conventional compression molding with no post-mold curing. FIGS. 8 and 9 show the results of inventive trials. The trial in FIG. 8 was performed in an insulated chamber, and the trial in FIG. 9 was performed with a medium of air in a convection oven heated to 350° F. The trials in FIGS. 8 and 9 were both done with a post-mold cure time of 10 minutes.

It is shown that the cores made according to the inventive methods and shown in FIGS. 8 and 9 have a concentration of compressions in the range of 84 to 86. For FIG. 8, 80% of the cores were within the range of 84 to 86 and for FIG. 9, 86% of the cores were in the range of 84 to 86, while the prior art method, as shown in FIG. 7, resulted in cores having 84% of compressions spread out over 82 to 85 compression. Thus, not only does the inventive method produce cores having higher compressions, the inventive method also produces cores having a more consistent range of compressions with a shorter mold time.

While the above invention has been described with reference to certain preferred embodiments, it should be kept in mind that the scope of the present invention is not limited to these embodiments. For example, the system can be used with a compression mold that is spaced from the medium chamber so that these components are not integral. One skilled in the art may find variations of these preferred embodiments which, nevertheless, fall within the spirit of the present invention, whose scope is defined by the claims set forth below.

What is claimed is:

1. A method of forming a core of a golf ball comprising the steps of:
    a. providing a core material;
    b. compression molding the core material in a mold cavity at a first predetermined temperature for a first predetermined time such that the core material becomes a partially-cured core; and
    c. placing the partially-cured core in a medium at a second predetermined temperature for a second predetermined time to form a substantially-cured core;
    wherein the medium comprises a plurality of solid particles having a particle size from 40 $\mu$m to 0.1 inches and an average specific heat value in the range from 0.010 BTU/lb–° F. to 1.00 BTU/lb–° F.

2. The method of claim 1, wherein the first predetermined temperature is between about 250° F. and about 500° F.

3. The method of claim 1, wherein the first predetermined time is between about 3 minutes and about 30 minutes.

4. The method of claim 1, wherein the first predetermined temperature is between about 300° F. and about 400° F.

5. The method of claim 1, wherein the second predetermined temperature is substantially greater than the first predetermined temperature.

6. The method of claim 1, wherein the second predetermined temperature is between about 300° F. and about 500° F.

7. The method of claim 1, wherein the second predetermined temperature is between about 350° F. and about 500° F.

8. The method of claim 1, wherein the second predetermined time is between about 5 minutes and about 20 minutes..

9. The method of claim 1, wherein the medium is a fluid.

10. The method of claim 9, wherein the fluid is a non-penetrating liquid.

11. The method of claim 9, wherein the fluid is air.

12. The method of claim 1, wherein the step of placing the partially-cured core in a medium further includes placing the partially-cured core in a convection oven.

* * * * *